PITCH CONTROL SYSTEM

Original Filed July 30, 1964

INVENTORS
PHILIP E. BARNES
RAYMOND N. QUENNEVILLE
BY Harris G. Luther
ATTORNEY

United States Patent Office

Re. 26,461
Reissued Sept. 17, 1968

26,461
PITCH CONTROL SYSTEM

Philip E. Barnes, North Granby, and Raymond N. Quenneville, Suffield, Conn., assignors to United Aircraft Corporation, East Hartford, Conn., a corporation of Delaware Original No. 3,212,586, dated Oct. 19, 1965, Ser. No. 386,254, July 30, 1964. Application for reissue Jan. 25, 1967, Ser. No. 620,551

26 Claims. (Cl. 170—160.32)

Matter enclosed in heavy brackets [ ] appears in the original patent but forms no part of this reissue specification; matter printed in italics indicates the additions made by reissue.

*ABSTRACT OF THE DISCLOSURE*

*A hydraulic actuator is actuated by supplying fluid thereto and bleeding fluid therefrom by a valve operatively connected to a rod and nut in threaded engagement. The rod is rotatable relative to and translatable together with the nut and carries valve means for directing fluid to and from the actuator. Input mechanism rotates the rod to position the valve means for controlling the position of the actuator and feedback is effectuated by a direct connection to the actuator that translates the nut which, in turn, carries the rod to return the valve to its balanced or null position. Loss of hydraulic fluid locks the actuator in position by virtue of the threaded engagement between the rod and nut. The actuator can be moved rectilinearly by rotating one element relative to the other element or breaking either the nut or the rod, while the other element rotates.*

This invention relates to a propeller pitch control system and particularly to a system having both hydraulic and mechanical pitch changing means and mechanism utilizing a portion of the mechanical pitch changing means as a mechanical pitch lock.

An object of the invention is mechanism by which the propeller may be feathered after complete failure of the pitch changing motor or its energy source.

Another object is a positive mechanical pitch lock which is immediately effective within about 1° of blade movement.

Another object is a pitch changing mechanism having a feed-back connection from the propeller blade to the control for the pitch changing motor and means utilizing that connection for adjusting the propeller pitch by means of the pitch changing motor, adjusting the propeller pitch mechanically and effecting a pitch lock.

Other objects and advantages will be apparent from the following specifications and the attached drawings in which.

Figures 1, 2:
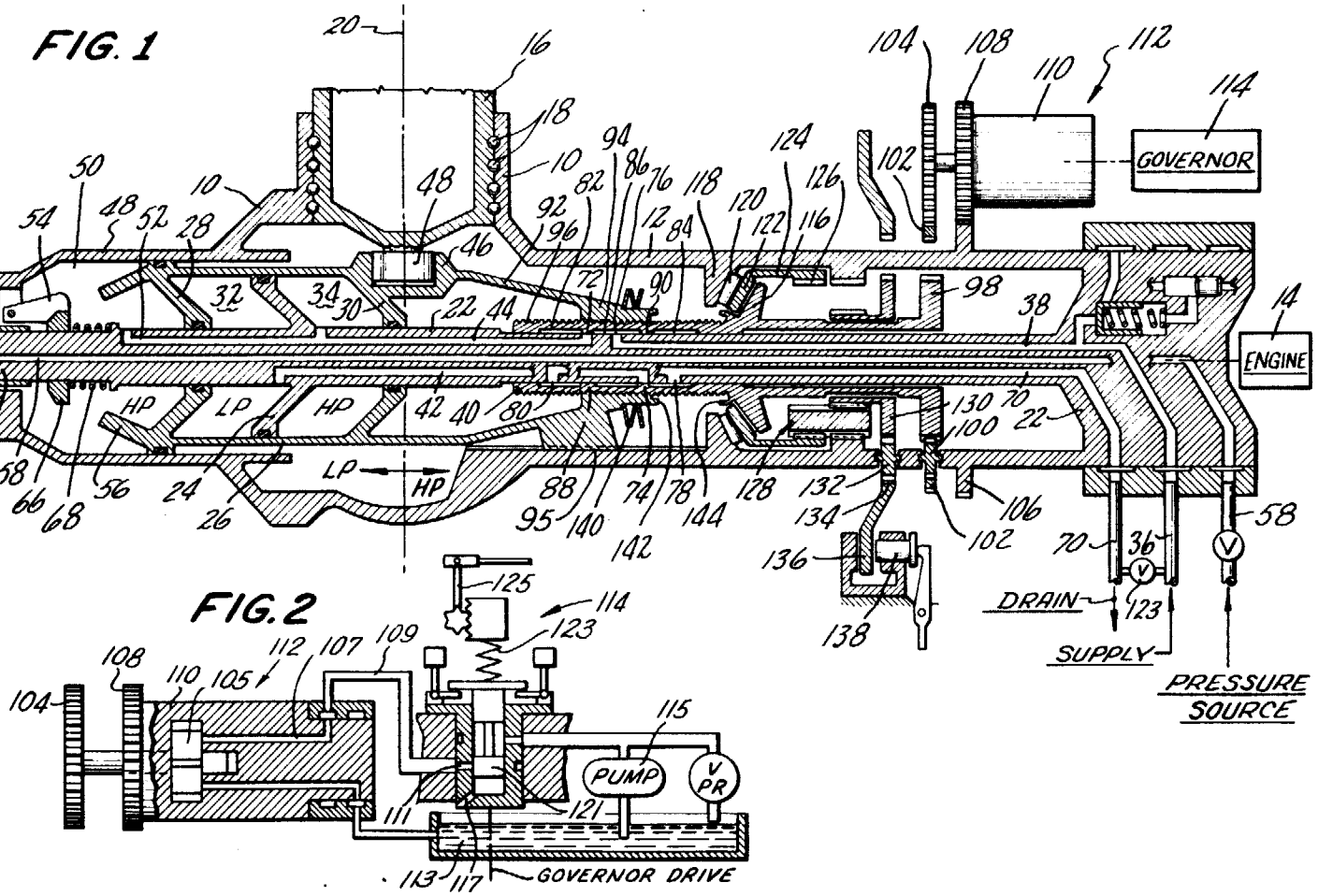
FIGURE 1 is a schematic representation of a structure incorporating the invention.
FIG. 2 is a schematic representation of the governor control mechanism for the pitch control system.

This invention is shown as incorporated in an aeronautical propeller having the usual hub 10 mounted on, secured to or integral with a shaft 12 connected with an engine 14 in any suitable well-known manner for driving the shaft and the propeller. The hub 10 supports any desired number of blades 16, although only one is shown for purposes of illustration, in any well-known manner for pitch changing rotation about an axis extending longitudinally of the blade and for rotating the blades with the hub about the axis of the shaft 12 for providing propulsion. As shown, the blades 16 are supported by ball bearings 18 in the hub 10 for rotation about the pitch changing axis 20. A tube 22 is secured at both ends to the shaft 12 against movement relative to the shaft 12. This shaft is provided with fluid passages and ports for the distribution and control of hydraulic fluid to a pitch changing motor and to a low pitch stop as will be described in more detail hereinafter. The tube 22 is provided adjacent the hub 10 and blade 16 with a piston 24 fixed on the tube. A cylinder 26 closed at both ends surrounds the piston 24 and together form a pitch changing motor. The ends 28 and 30 of the cylinder 26 form a fluid tight sliding joint with the exterior of the tube 22 to thereby form a low pitch chamber 32 and a high pitch chamber 34 within the piston 26 and separated by the piston 24. Hydraulic fluid under pressure from any suitable and well known source introduced through the supply line 36 and the conduit 38 in the tube 22 may be directed by a movable valve member 40 through either the conduit 42 to the low pitch chamber 32 to move the cylinder 26 in a direction to reduce the propeller pitch or through a channel 44 to the chamber 34 to move the cylinder 26 in the opposite direction to increase the propeller pitch. The cylinder 26 is connected in a well known manner by means of yoke or cam 46 and a roller 48 with the blade 16 for transforming the linear movement of the cylinder 26 into a rotary pitch changing movement of the blade 16. The outer circumference of the cylinder 26 forms a fluid tight joint with the inner surface of a cylindrical extension 48 of the hub 10 so as to form a chamber 50 at the end of the cylinder 26. Fluid under pressure is led through the extension 52 of the channel 44 into the chamber 50 at the time it is introduced into the chamber 34 to assist in moving the propeller blades toward high pitch. This additional area is desirable because of the inherent tendency of the propeller blades to reduce their pitch under the influence of centrifugal twisting moments which tendency must be overcome before the blades can be moved toward high pitch.

If desired a low pitch stop may be provided and which may take any suitable form. For purposes of illustration, the well known pivoted, retractible stop fingers 54 cooperating with the cylinder extension 56 are used to limit the low pitch movement to a preselected value in the normal operation of the propeller. Introduction of fluid under pressure through line 58 to a chamber 60 will urge piston 62 to the right, from the position shown in the figure maintained by the spring 64, into contact with the wedge 66 and move the wedge 66 to the right against the action of spring 68 to withdraw the wedge from under the fingers 54 to permit retraction of the fingers 54 and the movement of cylinder 26 to the left beyond the low pitch stop position and into reverse position if desired.

The movable valve member 40 is slidable axially of the tube 22 and cooperates with ports in that tube to selectively direct fluid to the chamber 32 and drain fluid from the chambers 34 and 50 or direct fluid to the chambers 34 and 50 and drain fluid through channels 70 from the chamber 32.

Channel 44 and its extension 52 terminates in a port 72 on the surface of tube 22 and channel 42 terminates in a port 74 on the surface of the tube 22. Channel 38 terminates in a port 76 on the surface of tube 22 and channel 70 terminates in ports 78 and 80 on the surface of the tube 22. The inner surface of the movable valve member 40 is provided with annular channels or grooves 82 and 84 always in fluid connection with the drain ports 78 and 80. A groove 86 between grooves 82 and 84 is provided on the interior surface of the movable valve member 40 and is always in fluid flow connection with the ports 76 of the pressure line 38. A land 88 cooperating with port 72 is provided between the grooves 82 and 86 and a land 90 between the groove 84 and the groove 86 cooperating with the port 74. The movable member 40 has an inoperative or null position as shown in the drawing in which no fluid is fed to or drained from the cylinder 26 or only sufficient fluid is fed to maintain the propeller against any pitch changing movement. The movable member 40 is connected with the cylinder 26 and through a connection formed by the yoke or cam 46 and roller 48 with the blades 16 by a sleeve 92 forming an extension of the cylinder 26. The sleeve 92 terminates in an internally threaded nut 94 cooperating with mating threads on the exterior of the movable member 40. These mating threads form a helical connection of helical members and provides a feedback from the propeller blades such that any tendency of the blades to move from a position determined by the null position of the movable member 40 will move the member 40 from the null position and return the blades to the selected pitch and the member 40 to the null position.

The movable member 40 is mounted for rotation about the tube 22 and may be rotated by any of the well known mechanisms, such as the single acting governor and double acting motor and gearing shown in Longfellow et al. Patent No. 2,664,960 or the double acting motor and double acting governor shown in Gaubis et al. Patent No. 3,170,521, for imparting controlled relative rotation to two concentric rotating members. For purposes of illustration this mechanism is shown, in this application, as a gear 98 secured to or integral with an extension of the member 40 meshing with a pinion 100 carried by the shaft 12 for transferring motion from the inside to the outside of the shaft 12. The pinion or pinions 100 mesh with an internal gear 102 having external teeth meshing with a controlled gear 104. A gear 106 fixed on or integral with shaft 12 meshes with a gear 108 concentric with the gear 104. Gear 108 is connected with the housing 110 of a gear or vane pump or motor 112 and gear 104 is connected with the gear or impeller 105 of the pump or motor. A governor 114 of any suitable type, such as disclosed in Jedrziewski Patent No. 2,636,566 if member 112 is used double acting or Woodward Patent No. 2,204,640 if member 112 is used single acting responsive to the speed of the shaft 12 or the engine 14 will drain fluid from or introduce pressure fluid to, or block flow of fluid into or from the pump or motor 112 to rotate the gear 98 in one direction or the other with respect to the shaft 12 or hold the gear 98 against rotation relative to the shaft 12. As shown in FIG. 2, in which the pump or motor 112 is shown as a single acting vane pump or motor for simplicity of showing although it might equally well be a gear pump or motor or other single or double acting positive displacement pump or motor, the single acting pump outlet 107 is connected by line 109 with the control port 111 of the governor 114 and the pump inlet is connected with a reservoir 113. The governor is supplied in the well-known manner with pressure by the pump 115 and drains to reservoir 113 through drain port 117. The governor is supplied with the usual fly weights and speeder spring 121 and governor adjusting means 125. Rotation of the gear 98 and the member 40 in one direction with respect to the shaft 12 and the nut 94 which is fixed against rotation with respect to the shaft 12 and blade support 10 by any suitable means such as splines 95 in a well-known manner such as shown in Gaubis Patent No. 3,153,454 or Barnes et al. Patent No. 3,163,231 will cause the member 40 to be threaded into or out of the nut 94 and move the member 40 in one direction longitudinally along the shaft 22 assuming the propeller blade is in a fixed position. Such motion will move the valve member 40 from its null position and also change the relation of the blade pitch and the linear position of said member 40 causing a change in propeller pitch which will restore the valve member 40 again to its null position. Rotation of the gear 98 and the member 40 in the opposite direction will of course translate the valve 40 in the opposite direction along the shaft 22 to thus change the propeller pitch in the opposite direction.

The member 40 is provided with an upstanding flange 116 secured to or formed integral with the member 40. The shaft 12 is provided with a depending flange member 118 secured to or integral with the shaft 12. The inboard face of the depending flange 118 forms or supports one race of a bearing having a roller 120. The other race 122 of the bearing is formed on the end of a sleeve 124 mounted for rotation within the shaft 12. An internal gear 126 is formed on the other end of the shaft 124 and forms part of a planetary reduction gear indicated generally at 128 which terminates in a gear 130. The gear 130 meshes with a series of planets 132 carried by the shaft 12 to bring the drive from the inside to the outside of the shaft 12. The planets 132 mesh with an internal gear 134 carried by a flange 136. Normally the flange 136 and the race 122 and all the connecting means therebetween rotate as a unit with the shaft including the roller 120 and the depending flange 118.

Upon any failure, accidental or intentional in a well-known manner such as shown in British patent to Charles, Milner and Fairhurst No. 517,372 by opening valve such as valve 123 connecting the pressure line 36 with the drain line 70, of the hydraulic system including the piston 24 or the cylinder 26 or the hydraulic supply source, the centrifugal twisting moment of the blades due to the rotation of the propeller will, through the yoke or cam 46 and roller 48 connection, cause the cylinder 26, the connection 92 and the sleeve 40 to move as a unit bodily toward the left in the illustrated embodiment. Such movement will cause the upstanding flange 116 to contact the race 122. The depending flange 118 will act as a stop preventing any further movement of the member 40 by the blades 16 after the upstanding flange 116 contacts the race 122. Flange 116 is normally spaced from the race 122 by an amount substantially equal to or slightly greater than the width of the port 72 or the land 78 or by an amount slightly greater than the motion required to saturate the valve 40. This clearance may be any desired amount and is normally, relatively small, being substantially the equivalent of about 1° of blade pitch.

Upon failure of the hydraulic system and after the flange 116 has been forced into contact with the blade race 122 the propeller may be turned to a high pitch position or in an increased pitch direction under the influence of a rotating or windmilling propeller by means of a brake 138 which may be operated to hold the flange 136 against rotation. Rotation of the propeller will then rotate race 126 and by means of friction between the race 126 and the flange 116, which friction may be augmented by teeth or friction material if desired, will rotate the flange 116 and the member 40 with respect to the shaft 12, and the nut 94. Rotation of the threaded member 40 inside of the nut 94 will force the nut 94 along the tube 22 and the shaft 12 and move the propeller blades 16 in a pitch increasing direction to a feathered position where the windmilling will stop and the blade will cease rotating. As long as the brake 138 remains applied, any rotation of the propeller will change the propeller pitch to bring the blades to a feathered position in which there will be no further windmilling. The flange 136 acts through the reduction gear 128 so as to rotate the blade race and friction element 122 slightly faster than or preferably slightly slower than the rotation of the shaft 12. It will be appreciated that the centrifugal twisting moment of the blades 16 must be sufficient to force the flange 116 to the left with sufficient force to provide enough friction between the flange 116 and the blade race 122 to rotate the movable valve member 40 with respect to the shaft 12 and the nut 94. As the propeller blades approach the feathered position and slow down in their rotation the centrifugal twisting moment will be reduced and in order to maintain the frictional contact between the flange 116 and the race 122, Belleville springs which are carried by the nut 40 contact the inturned flange 118 and maintain a load on the flange 116 and the race member 122 which is absorbed through the roller bearing 120.

The operation of the mechanism is as follows: During normal, on speed operation, the input drive gear 102 is held fixed relative to gear 106 and the propeller shaft 12 by the propeller control motor or pump 112. The low ratio gear system 98, 100, 102 holds the screw 96 and the control valve 40 fixed with respect to the internal parts of the propeller including the tube 22 and its ports. In this position the control valve 40 is in the null position which may be a center position in which it will completely block fluid flow to or from the propeller or may be a position off the center position by an amount sufficient to maintain hydraulic pressure in the high pitch chamber 34 sufficient to balance the propeller loads, and maintain the propeller blade angle in a fixed or given position.

For overspeed conditions the control system including the governor 114 will detect the overspeed, connect port 111 and pump outlet 107 with drain and unblock the pump 112. The friction of gears 100 and 102 is sufficient to cause the gear 102 to rotate with respect to the gear 108 in a direction opposite to the propeller rotation. This motion transmitted through the low ratio gearing 98, 100 and 102 will rotate the valve member 40 and the threads formed on the outside thereof in a direction to advance the member 40 toward the left or outboard end of the propeller. This movement of the control valve member 40 will admit hydraulic pressure fluid to the ports 72 and the high pitch chambers 34 and 50 and connect port 74 and low pitch chamber 32 with the drain line 70 which will move the cylinder 26 toward the right or inboard and thus move the blades to a higher pitch. The inboard motion of the cylinder 26 and the nut 94 occurs at the same rate as the lead of the screw threads 96. The maximum forward displacement of the valve member 40 is limited to the valve opening required to move the cylinder 26 to the maximum high pitch blade rate. As the member 40 moves forward the clearance between the upstanding flange 116 and the bearing race 122 is reduced. This clearance is greater than the motion required to saturate the control valve in the high pitch direction. Therefore, as long as the hydraulic system operates normally the thrust bearing 120 will not interfere with the operation of the control system.

The motion of the blades towards increased pitch will decrease the propeller speed until the on speed condition is reached. The propeller control including the governor 114 will then stop the rotation of the input gear 102 with respect to the gear 106 and the blades will remain fixed as described for the on speed case.

During under speed condition the propeller control mechanism acts in the opposite sense to that described above for the over speed case and reduces the propeller pitch. The governor 114 will introduce oil under pressure from pump 115 into the pump mechanism 112 and pump outlet 107 and drive the pump as a motor so as to cause the gear 104 to drive the gear 102 faster than the rotation of the shaft 12 so as to move the valve member 40 inboard and connect the chambers 34 and 50 with the drain lines 70 and the chamber 32 with the pressure line 38.

The axial motion of the valve member 40 required for normal propeller control is limited to the motion required to actuate the control valve to high pitch in one direction and to actuate the control valve to low pitch in the other direction. The clearance between the flange 116 and the thrust bearing race 122 and roller 120 is always maintained at a small value. This clearance represents a blade angle change of less than 1°. The blade reaction forces including the centrifugal twisting moments act in a direction to move the cylinder 26 in the low pitch direction and therefore the nut 94 and the valve member 40 and its flange 116 are always maintained in a position to lock the hydraulic pitch change mechanism in the event of a loss of hydraulic power. It should be noted that the nut 94, the screw thread 96, the valve member 40, the flange 116 and the thrust bearing 120 represent a completely independent load path capable of supporting the blade loads and effectively lock the blade pitch. These elements are not subjected to fatigue loads and therefore represent an extremely reliable load path.

Normal feathering is accomplished in a conventional manner such as by biasing governor 114 to an overspeed condition by raising governor valve 121 manually by operation of the governor control 125 to move the valve member 40 to the left as explained in the overspeed condition and using the hydraulic pitch change system to continue operation of the increased pitch up to the feathered position. Feathering may also be accomplished by the mechanical system alone by first biasing the governor as in normal feathering and then actuating the mechanical pitch change mechanism. A loss of hydraulic power either accidentally or intentionally will bring the thrust face of the flange 116 into contact with the thrust bearing race 122 and thrust bearing 120. The race 122 is driven through the gear reduction unit 128 by applying the brake 138 to the flange 136 as long as the propeller is windmilling or the shaft 12 is rotated. The power required to turn the flange 116 and increase the propeller pitch comes from the rotational energy of the propeller. The rotation of the race member 122 by rotation of the shaft 12 with the brake 138 applied will be in a direction to turn the valve member 40 and the screw threads 96 thereon in a direction to force the nut 94 and with it the cylinder 26 and the yoke 46 to the right and move the blades toward the feathered position. The travel of the nut 94 is sufficient to allow the blades to exceed the full feather position by a few degrees. At this angle the aerodynamic forces on the blade reverse and turn the propeller in the opposite direction or backwards. In this position the flange 116 is held in frictional engagement with the race 122 by the Belleville springs 140 so that reverse rotation and the springs 140 will bring the blades back toward the zero feather angle. Any further rotation of the propeller causes the blades to seek the aerodynamic zero feather angle. In order to prevent the feather system from overshooting the feather position by a large amount, a stop 142 is provided on the nut 94 for contact with the abutment 144 on the rotatable member 40. As this stop is engaged, slippage must occur in the mechanical drive of the flange 116 and this occurs along the friction faces between the flange 116 and the bearing race 122.

It is to be understood that the invention is not to be limited to the specific embodiments herein illustrated and described, but may be used in other ways without departure from the spirit and that various changes can be made which would come within the scope of the invention which is limited only by the appended claims.

We claim:

1. Pitch lock means for a controllable pitch propeller having blades, a blade supporting hub and a pitch changing motor connected to said blades, comprising a control member for said motor having a linearly movable portion, means, including a first connection and a second connection arranged in series and connecting said blades with said movable portion, said first connection including means transforming pitch changing movements of said blades into bodily linear movement of said second connection and said movable portion as a unit, said second connection including two relatively movable parts, means, including pitch control mechanism, for relatively adjusting said parts for changing the relation of the blade pitch and the linear position of said movable portion, said movable portion having a neutral position fixed with respect to said hub and having a relatively small linear control movement to one side of said neutral position for controlling energization of said motor, positive mechanical stop means co-acting with said movable portion and blocking linear movement of said movable portion by said blades and thus blocking blade induced pitch change upon failure of said member to energize said motor within said relatively small control movement, and thus provide a pitch lock for said blades.

2. Pitch lock means as claimed in claim 1 in which said stop means is an abutment fixed with respect to said hub and located in the path of movement of said movable portion by said blades.

3. Pitch lock means as claimed in claim 1 in which the first connection is a form of cam and roller and the second connection is formed of mated helical or screw threaded members having an axis extending in the direction of said linear movement, one of said helical members being fixed with respect to said motor and said motor being fixed against rotation relative to said blade support.

4. Pitch lock means as claimed in claim 1 in which said stop means defines a limited position of said portion, and in which said means adjusting said connecting means changes the relation between the pitch of said blades and said stop limited position of said movable portion.

5. Pitch lock means as claimed in claim 4 in which said movable portion is mounted for linear movement along an axis by said blades and said second connection comprises a helical connection extending in the direction of said axis.

6. Pitch lock means as claimed in claim 1 in which said motor is a hydraulically actuated motor and said control member is a valve controlling the flow of fluid to said motor and having a portion fixed with respect to said hub cooperating with said movable portion.

7. Pitch lock means as claimed in claim 6 in which said valve movable portion is movable along an axis for control operation and is rotatable about said axis and said connecting means comprises a helical connection adjustable by rotation of said movable portion, said helical connection having one portion fixed with respect to said motor.

8. Propeller pitch changing mechanism for a propeller having blades and a blade support, comprising a pitch changing motor having a translatable part connected with said blades, control means for said motor including a control member, means connecting said member with said motor part including a threaded connection, said connection having one threaded portion fixed with respect to said motor part and the other threaded portion fixed with respect to said control member, said motor part translating said member bodily directly with translation of said part, said member being rotatable through said threaded connection with respect to and independent of said part, said threaded connection causing translation of said member relative to said part upon rotation of said member independent of part, said control means including an element fixed with respect to said blade support and cooperating with said control member and controlling the energization of said motor by translation of said member relative to said fixed element and forming with said member a follow up control actuated by said motor to deenergize said motor.

9. In a propeller as claimed in claim 8 in which the motor is hydraulically actuated and the control member is a portion of a valve connected with the motor by hydraulic lines and located in the blade support, means external of said support for moving said control member in said support to control energization of said motor.

10. A propeller as claimed in claim 8 in which the motor is hydraulically actuated and the translatable control member is a valve member forming a portion of a control valve, means for moving said valve member to control energization of said motor including first means for rotating said valve member and actuating said threaded connection to translate said valve member and other means for mechanically actuating said valve member including means for rotating said valve member and actuating said threaded connection for translating said valve member and means for limiting translating movement of said valve with respect to said blade support so that rotation of said valve member with respect to said motor part by said other means will mechanically move the propeller blades to change their pitch upon failure of said valve member to energize said motor.

11. Mechanism as claimed in claim 10 including governor controlled means actuating said first means for rotating said valve member.

12. Pitch changing means for a propeller having blades, means supporting said blades for pitch changing movement, and a pitch changing motor connected to said blades comprising a control member for said motor, means connecting said member with said blades and translating said member by pitch change of said blades, means changing the effective length of said connecting means and means holding said member against translation, and changing the blade pitch independent of pitch change by said motor by changing the effective length of said connecting means.

13. Pitch changing means for a propeller having blades, means supporting said blades for pitch changing movement, and a pitch changing motor connected to said blades, comprising a control member for said motor, means connecting said member with said blades and moving said member by pitch change of said blades, stop means limiting movement of said member by said blades, said connecting means including an adjustable connection operable to relatively move said blade pitch position and said member and means for operating said adjustable connection with said member positioned by said stop means to change the pitch of said blades.

14. Pitch changing means as claimed in claim 13 in which said member is threaded and said adjustable connection comprises a nut connected to said blades mating with threads on said member and said means for operating comprises means for rotating said member and threads relative to said nut.

15. Pitch changing means as claimed in claim 13 in which said stop means includes a first bearing race secured to said supporting means and a second bearing race cooperating with said first race and having a friction surface, a cooperating friction surface carried by said member and movable by said blades and member into engagement with said race friction surface and said means for operating comprises gear reduction means connecting said second race with means holding one end of the gear train of said gear reduction means against rotation while said propeller is rotating to rotate said second race and said member with respect to said nut and said supporting means.

16. In a controllable pitch propeller having blades and a pitch changing motor connected with said blades, a movable control member having a null position and an energizing position and controlling energization of said motor, means connecting said member with said blades returning said member to null position incident to movement of said blades by said motor, stop means in the path of movement of said member limiting movement of said member by said blades, means moving said member relative to said blades while in contact with said stop means and thereby moving said blades to change their pitch independent of said motor.

17. In combination, a hub and shaft rotatable as a unit, propeller blades supported by said hub for pitch changing movement, a hydraulic motor connected with said blades for imparting pitch changing movement to said blades, means for introducing hydraulic fluid under pressure to said motor, means controlling the flow of hydraulic fluid to said motor comprising valve means having one portion fixed with respect to said hub and another portion movable with respect to said fixed portion and having a null position holding said motor stationary and a position to one side of said null position directing fluid to said motor, means, including mated helical members, mechanically connecting said movable valve portion with said motor for movement by said motor, means, including means rotating one helical member with respect to the other and moving said movable portion to said fluid directing position, said motor returning said movable portion to null position, mechanical stop means limiting movement with respect to said fixed portion and said hub, of said movable portion by said motor and additional means for rotating said one helical member with respect to the other upon failure of hydraulic pressure fluid to maintain said movable member against said stop means and utilize said helical members to mechanically move said motor and change the propeller pitch.

18. A propeller having a hub, blades supported by said hub for pitch changing movement, a pitch changing motor connected with said blades and means for energizing said motor including control means connected with said motor and controlling energization of said motor, means including a screw thread connection mechanically connecting said control means and said blades and means mechanically rotating said control means and utilizing said screw thread connection to mechanically change the propeller pitch upon failure of said motor.

19. A hub and a shaft rotatable as a unit, propeller blades supported by said hub, a hydraulic motor rotatable with said hub comprising a piston fixed with respect to said hub and a cylinder surrounding said piston and axially movable thereon, means connecting said cylinder with said blades for imparting pitch changing movement to said blades upon axial movement of said cylinder, means for introducing hydraulic fluid under pressure to said motor for energizing said motor for moving said cylinder in opposite axial directions, means controlling the flow of hydraulic fluid to and from said motor for controlling the energization thereof comprising valve means including one portion fixed with respect to said hub and another portion movable with respect to said fixed portion and having a null position for controlling fluid flow and holding said motor stationary and positions on either side of said null position for directing fluid to and energizing said motor and moving said motor in one direction or the other, means, including mated helical members, mechanically connecting said movable control portion with said movable cylinder of said motor for imparting movement of said cylinder and blades to said movable portion to restore said movable portion to its null position, means, including means rotating one helical member with respect to the other helical member for moving said movable portion with respect to said motor and blades to change the relation between the blade pitch and said null position, mechanical stop means, including a cooperating thrust bearing secured to said hub and a thrust flange secured to said movable portion mechanically limiting movement of said movable portion by centrifugal twisting moments of said blades throughout the propeller pitch range to substantially the distance from said null position to the fully open position of said movable portion, said movable portion operable in conjunction with said stop means to lock the propeller blades against pitch reduction upon failure of said motor or its controls, drive means for rotating said movable portion including a reduction gear connected with one portion of said thrust bearing and friction drive connection members including a frictional connection between said one bearing portion and said thrust flange and means holding one portion of said reduction gear against rotation while said shaft is rotating for rotating said movable portion, rotation of said movable portion rotating one helical member relative to the other helical member, movement of said movable portion limited by said stop means so that rotation of said movable member by said drive means will feather the propeller blades, and spring means assisting centrifugal twisting moments in holding said thrust flange against said thrust bearing and said friction drive connection members in frictional engagement.

20. In combination, in a controllable pitch propeller, propeller blades, a hydraulically actuated pitch changing motor operatively connected to said blades, control means for said motor operatively hydraulically connected to said motor, means mechanically connecting said control means to said blades, means actuating said control means to hydraulically actuate said motor, and other means actuating said control means including means manually applying force to said control means and through said control means manually applying force to said blades. to mechanically change the propeller pitch.

21. In a controllable pitch propeller as claimed in claim 16 spring means urging said member into contact with said stop means.

22. A combination as claimed in claim 17 in which said means for rotating said one helical member with respect to the other and moving said movable portion to said fluid directing position includes governor control means and said additional means for rotating said one helical member includes manually control means mechanically rotating said member.

23. A combination as claimed in claim 17 in which said mated helical members includes one member rotatably mounted with respect to the other member and the other member is fixed with respect to said motor.

24. In a controllable pitch propeller having blades and a blade supporting hub, a pitch changing motor connected to said blades including a motor having a part translatable with pitch changing movement of said blades and fixed against rotation with respect to said support, a translatable and rotatable control member for said motor carried by said hub and means mechanically connecting said motor part and blades with said rotatable control member for bodily translating said member with said motor part and rotatably connecting said motor part with said member for relative translation of said member and said motor part and blades by rotation of said member with respect to said motor part, governor controlled means rotating said member relative to said blade support to translate said member and energize said motor, other means rotating said member relative to said blade support including means holding said member against translation with respect to said support while rotating said member and thereby translating said motor part and changing the pitch of said blades.

*25. Apparatus for translating a device intended to be translated and support therefor, an actuator having a translatable part connected with said device, control means for said actuator including a control member, means connecting said control member with said actuator part including a threaded connection, said connection having one threaded portion fixed with respect to said actuator part and the other threaded portion fixed with respect to said control member, said actuator part translating said member bodily directly with translation of said actuator part, said control member being rotatable through said threaded connection with respect to and independent of said part, said threaded connection causing translation of said control member relative to said part upon rotation of said member independent of said actuator part, said control means including an element fixed with respect to said support and cooperating with said control member and controlling the energization of said actuator by translation of said control member relative to said fixed ele-*

*ment and forming with said control member a follow-up control actuated by said actuator to position said actuator.*

*26. A hydraulically energized actuator having a member moveable rectilinearly characterized by being held stationary upon the loss of hydraulic fluid, hydraulic means including control means for urging said member rectilinearly, said control means including a rotatable element, a threaded element attached to said member and threadably engaging said rotatable element, said rotatable element moveable with and independently of said member, a control valve normally in a null position moveable to apply hydraulic fluid to and from said member for hydraulically moving said member rectilinearly, feedback means interconnecting said member and control valve for returning said control valve to the null position, the threads*

*of said rotatable element and said threaded element having sufficient friction therebetween to prevent relative rotation upon the application of force on said member.*

References Cited

The following references, cited by the Examiner, are of record in the patented file of this patent or the original patent.

UNITED STATES PATENTS 3,027,949 4/1962 Bierman ------ 170—160.32 X

FOREIGN PATENTS 882,417 11/1961 Great Britain.

EVERETT A. POWELL, JR., *Primary Examiner.*